United States Patent [19]

Klein

[11] Patent Number: 4,807,940
[45] Date of Patent: Feb. 28, 1989

[54] VEHICULAR HYDRAULIC BRAKE SYSTEM FOR AN AUTOMOTIVE VEHICLE WITH HYDRAULIC LEVEL ADJUSTMENT AT ONE WHEEL AXLE

[75] Inventor: Hans-Christof Klein, Hattersheim, Fed. Rep. of Germany

[73] Assignee: Alfred Teves GmbH, Frankfurt am Main, Fed. Rep. of Germany

[21] Appl. No.: 181,336

[22] Filed: Apr. 14, 1988

[30] Foreign Application Priority Data

Apr. 23, 1987 [DE] Fed. Rep. of Germany ....... 3713640

[51] Int. Cl.⁴ .............................................. B60T 8/58
[52] U.S. Cl. ..................................... 303/100; 303/103
[58] Field of Search .................. 280/707; 303/92, 93, 303/100, 102, 103, 116, 22.5

[56] References Cited

U.S. PATENT DOCUMENTS 4,743,073 5/1988 Gruenberg ............................ 303/92

FOREIGN PATENT DOCUMENTS 0059552 4/1984 Japan .................................. 303/100
0067606 4/1986 Japan .................................. 303/100

Primary Examiner—Duane A. Reger
Attorney, Agent, or Firm—James B. Raden

[57] ABSTRACT

A hydraulic brake system for automotive vehicles with an anti-skid device is combined with a hydraulic level adjustment system by simultaneously utilizing the brake line leading to the rear axle for level adjustment. The brake line leading to the rear axle is utilized for the transmission of the level adjustment pressure whenever the brake pedal is not applied. In the case of the brake pedal being applied, however, the level adjustment system is inactivated.

5 Claims, 1 Drawing Sheet

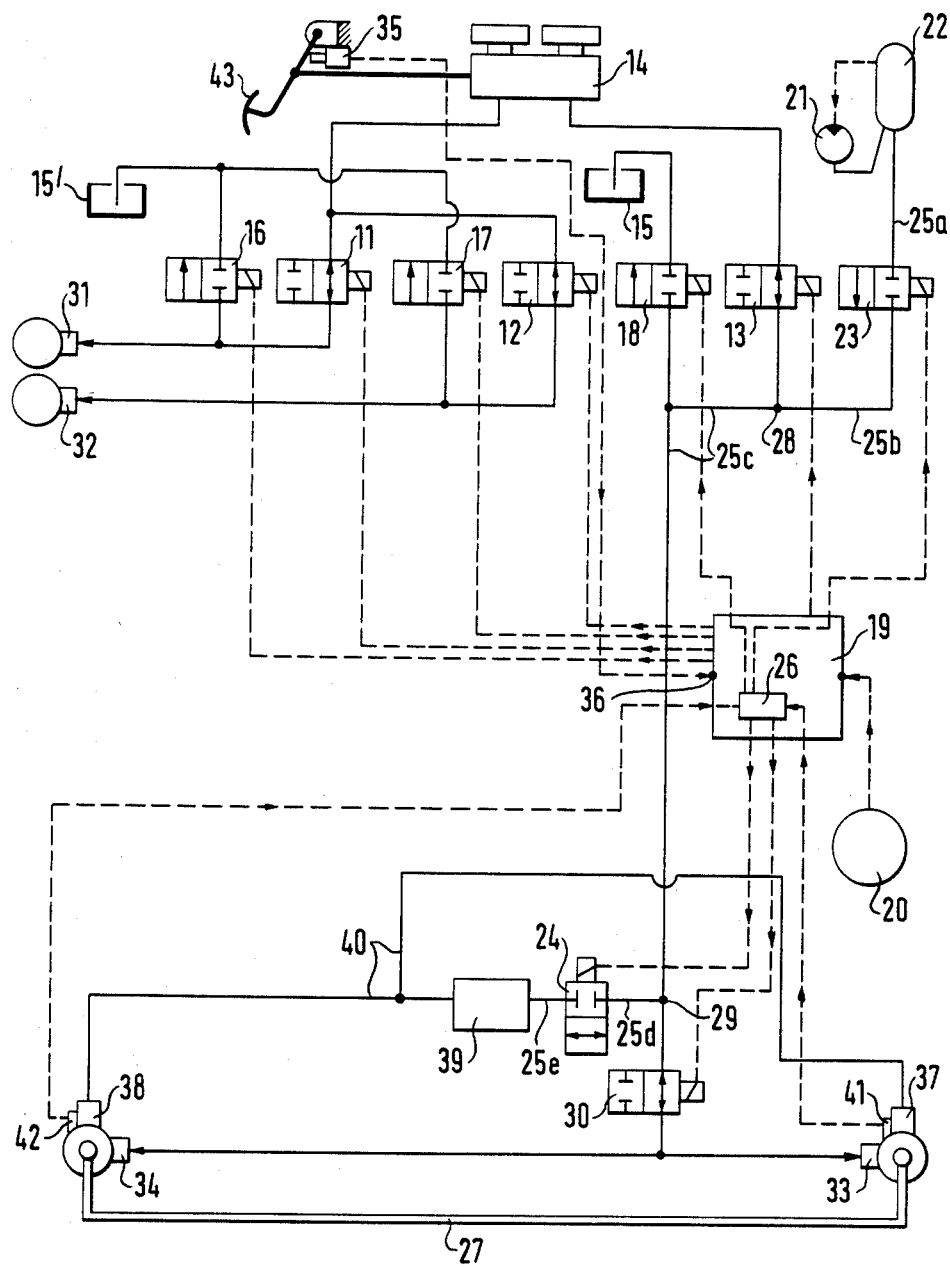

4,807,940

VEHICULAR HYDRAULIC BRAKE SYSTEM FOR AN AUTOMOTIVE VEHICLE WITH HYDRAULIC LEVEL ADJUSTMENT AT ONE WHEEL AXLE

BACKGROUND OF THE INVENTION

This invention relates to a hydraulic brake system for automotive vehicles with an anti-skid device which comprises closing valves connected in each brake circuit between the master cylinder and the wheel brake cylinders and opening valves connected between the return reservoir and the wheel brake cylinders. The valves are actuated in such a manner by an anti-skid control circuit acted upon by wheel sensors as to ensure that a wheel slip occuring during braking will be prevented at one of the wheel axles, preferably at the rear wheel axle. A hydraulic level adjustment system is provided which has hydraulic lifters at the applicable wheel axle, at least one pressure source, a pressure line leading from the pressure source to the axle concerned, at least one level adjustment opening valve in the pressure line and one level adjustment closing valve at the pressure line. The valves are alternatively opened by a level adjustment control circuit as a function of and in response to level control signals emitted by level sensors.

Level adjustment in automotive vehicles generally is provided at the rear axle so as to keep the vehicle level at the same elevation for different loadings. Generally, such level adjustment systems are connected to a hydropneumatic pressure accumulator kept in a charged condition by means of a hydraulic pump. If too low a level of the vehicle body is indicated by a level sensor, the lever adjustment opening valve will be opened and pressure will be transmitted from the hydropneumatic pressure accumulator to the hydraulic lifters whereby the nominal level will be re-established. If the level of the vehicle body is too high, a level adjustment opening valve will ensure the return of hydraulic fluid to the return reservoir.

As the level adjustment system generally is located at the rear axle of the vehicle while the components generating the hydraulic pressure are situated in the area of the engine space the expenditure for lines for the supply of the level adjustment system is considerable. This substantial expenditure is due to the fact that the respective hydraulic lines must be rated for comparatively high pressures.

SUMMARY OF THE INVENTION

It is an object of the present invention to provide a hydraulic brake system for automotive vehicles of the type referred to above where the expenditure for level adjustment lines is reduced.

This object is achieved by the present invention in that the brake line leading to the axle concerned is used as a pressure line by connecting a first level adjustment opening valve in the pressure line section extending upstream of the connection to the brake line and by connecting a second level adjustment opening valve in the pressure line section following a branch-off point of the brake line. A level adjustment closing valve is connected between the branch-off point and the wheel brake cylinders of the applicable wheel axle. The two level adjustment opening valves and the level adjustment closing valve can be operated by the level adjustment control circuit only if no braking action is taking place.

The existing brake line which already leads from the vehicle's front area to the rear axle is additionally used for the supply of the level adjustment system. In doing so, the present invention advantageously utilizes the fact that during the operation of a vehicle the phases in which there is a braking operation are relatively short so that the brake lines are not used in the very long periods between the individual braking phases and thus at least partially can also be utilized for the application of the level adjustment system at the rear axle. It is provided that the operation of the brake has absolute priority, that is, that any level adjusting operation possibly taking place will be stopped immediately if the brake lines are needed for carrying out a braking operation.

To this end, according to a first embodiment of the present invention, it can be provided that the level adjustment control circuit is a component of the anti-skid control circuit and that the anti-skid control circuit has a braking signal input connected to a brake sensor. The anti-skid control circuit inactivates the level adjustment control circuit when a braking signal appears at the braking signal input.

The elimination of a special pressure reducing valve for the level adjustment system can be realized in that the opening valve for anti-skid control of the applicable axle also is the pressure reducing valve of the level adjustment system. This embodiment also advantageously utilizes the fact that the anti-skid device opening valve serves no function when there is no braking operation. Thus at this stage the opening valve can be utilized for the purposes of level adjustment. Further, according to the present invention, in this case it is expediently provided that the opening valve is acted upon by both the anti-skid control circuit and the level adjustment circuit.

As the hydraulic fluid used for level adjustment generally differs from the brake fluid used in the brake system a further embodiment provides that a media separating cylinder is connected between the hydraulic lifters and the second level adjustment opening valve in order to separate the brake fluid in the pressure line from the mineral oil in the level adjustment circuit.

BRIEF DESCRIPTION OF THE DRAWING

This invention will now be described in the following detailed description, reference being made to the drawing the single figure of which is a schematic block diagram representation of a vehicular hydraulic brake system of an automotive vehicle with level adjustment in accordance with the principles of the present invention.

DETAILED DESCRIPTION OF A PREFERRED EMBODIMENT

In the drawing, the wheel brake cylinders 31, 32 of the front wheels of an automotive vehicle are connected to one of the circuits of a tandem master cylinder 14 by way of normally open closing valves 11, 12. The wheel brake cylinders 31, 32 of the front axle are connected to a return reservoir 15' by way of normally closed opening valves 16, 17. The other circuit of the tandem master cylinder 14 is connected to the two wheel brake cylinders 33, 34 of the wheels of the rear axle 27 of the automotive vehicle by way of a normally open closing valve 13 and a brake line 25c as well as by way of a level adjustment closing valve 30 which will be described in greater detail hereinafter. A normally closed opening valve 18 connects the brake line 25c with a return reservoir 15. All the illustrated valves are electromagnetically operated and are connected with an anti-skid control circuit 19 in the manner indicated by broken lines. The anti-skid control circuit 19 is acted upon by wheel sensor 20 schematically set forth in the drawing.

Upon a brake application the wheel brake cylinders 31, 32, 33, 34 are acted upon by hydraulic pressure by way of the open closing valves 11, 12, 13 as well as by way of the open level adjustment closing valve 30. If any one of the wheel sensors 20 detects a wheel slip at any one of the wheels, the associated closing valve 11, 12, or 13 will be closed and the associated opening valve 16, 17, or 18 will be opened in a controlled manner until the wheel slip is eliminated at the respective wheel. Thus far, the mode of operation of the inventive brake system corresponds to normal operation.

A pump 21 arranged in the engine space is connected to a hydropneumatic pressure accumulator 22 permanently kept in a charged condition by the pump 21, as indicated by a broken line between the pressure accumulator 22 and the pump 21. By way of a pressure line 25a, the pressure accumulator 22 is connected to a level adjustment opening valve 23 which, on its part, is connected to a connection point 28 by way of a pressure line 25b. At the connection point 28 the pressure line 25b is connected with the brake line 25c leading to the rear axle 27 of the automotive vehicle.

In the area of the rear axle 27, a pressure line 25d branches off from a branch-off point 29 in front of the level adjustment closing valve 30, and leads to a second level adjustment opening valve 24 connected with a media separating cylinder 39 by way of a pressure line 25e. The outlet of the media separating cylinder 39 is connected to the hydraulic lifters 37, 38 of the two rear wheels. Level sensors 41, 42 at the two rear wheels act on a level adjustment control circuit 26 in the manner indicated by broken lines, the level adjustment control circuit 26 being integrated into the anti-skid control circuit 19. In the area of the brake pedal 43 a brake sensor 35 is provided in the form of a movable sensing pin. By way of a line illustrated by a broken line, brake sensor 35 likewise is connected to the anti-skid control circuit 19, namely by way of a braking signal input 36.

The valves 18, 23, 24 and 30 provided for level adjustment are also connected with the level adjustment control circuit 26, the connection being such as to ensure that the overall arrangement will work as follows:

If the brake is not applied, that is, if no input signal appears at the braking signal input 36, the anti-skid control circuit 19 will activate the level adjustment control circuit 26. That is, the closing valve 13 for the rear axle 27 and the level adjustment closing valve 30 will be closed. At the same time the second level adjustment opening valve 24 will be opened. At this point, the level adjustment system will be ready for operation. The level sensors 41, 42 will cause the level adjustment control circuit 26 to alternatively close the opening valve 18 and to open the opening valve 23 or vice versa depending on whether a pressure is to be built up or reduced in the level adjustment circuit 40.

There is also a residual pressure compensation position in which the closing valve 13 is open while opening valve 23, the opening valve 18, the level adjustment closing valve 30, and the level adjustment opening valve 24 are closed. Due to this switching position there with be effected the residual pressure compensation of the compression volume in the feed line by way of the master-cylinder/return-reservoir connection path.

As soon as a braking operation is initiated by depressing brake pedal 43, the brake sensor 35 will also be actuated so that there will appear a signal at the braking signal input 36 due to which the anti-skid control circuit 19 will inactivate the level adjustment control circuit 26 which will result in the opening valve 18 and the closing valve 13 operating in accordance with anti-skid control. At this point, the level adjustment opening valves 23, 24 will be closed permanently and the level adjustment closing valve 30 will be opened permanently.

Thus, the arrangement in accordance with the present invention has two different operating conditions. That is, the level adjustment operating condition which will be adopted whenever no braking action takes place, and the braking condition when the brake pedal 43 is applied.

What is claimed is:

1. A hydraulic brake system for automotive vehicles having wheel axles with an anti-skid device which comprises closing valves connected in each brake circuit between the master cylinder and the wheel brake cylinders and opening valves connected between the return reservoir and the wheel brake cylinders, said valves being actuated by an anti-skid control circuit responsive to wheel sensors to ensure that a wheel slip occurring during braking is prevented, a hydraulic level adjustment system at one of the wheel axles comprising hydraulic lifters at the one wheel axle, at least one pressure source, a pressure line leading from the pressure source to said one axle, at least one level adjustment opening valve in the pressure line and one level adjustment closing valve at the pressure line, which valves are alternatively opened by a level adjustment control circuit in response to level control signals emitted by level sensors, wherein the brake line leading to said one axle is used as a pressure line by connecting a first level adjustment opening valve in the pressure line section extending upstream of the connection to the brake line and by connecting a second level adjustment opening valve in the pressure line section following a branch-off point of the brake line, which is arranged in the area of said one wheel axle, and wherein between the branch-off point and the wheel brake cylinders of said one wheel axle a level adjustment closing valve is connected, and wherein the two level adjustment opening valves and the level adjustment closing valve can be switched into the opening position by the level adjustment control circuit only if no braking action takes place.

2. The brake system as claimed in claim 1, wherein the level adjustment circuit is a component of the anti-skid control circuit and wherein the anti-skid control circuit has a braking signal input connected to a brake sensor, with the anti-skid control circuit inactivating the level adjustment control circuit by keeping the level adjustment opening valves permanently closed when there appears a braking signal at the braking signal input.

3. The brake system as claimed in claim 1 wherein the opening valve for anti-skid control of said one axis also is the pressure reducing valve of the level adjustment system.

4. The brake system as claimed in claim 3 wherein the opening valve for anti-skid control is acted upon by both the anti-skid control circuit and the level adjustment control circuit.

5. The brake system as claimed in claim 1 wherein a media separating cylinder is connected between the hydraulic lifters and the second level adjustment opening valve in order to separate brake fluid in the pressure line from mineral oil in the level adjustment circuit.

* * * * *